United States Patent
Sohi et al.

(10) Patent No.: US 12,044,619 B2
(45) Date of Patent: Jul. 23, 2024

(54) VIBRATION CORRECTION METHODS AND SYSTEMS FOR GAS DETECTING APPARATUSES

(71) Applicant: Rebellion Photonics, Inc., Houston, TX (US)

(72) Inventors: Mohammad Lotfollahi Sohi, Houston, TX (US); Reza Katebi, Charlotte, NC (US); Chuan Zhao, Charlotte, NC (US); Patrick Charles O'Driscoll, Houston, TX (US); Quan Shen, Charlotte, NC (US)

(73) Assignee: REBELLION PHOTONICS, INC., Houston, TX (US)

( * ) Notice: Subject to any disclaimer, the term of this patent is extended or adjusted under 35 U.S.C. 154(b) by 315 days.

(21) Appl. No.: 17/457,689

(22) Filed: Dec. 6, 2021

(65) Prior Publication Data

US 2023/0175958 A1  Jun. 8, 2023

(51) Int. Cl.
*G06F 16/185* (2019.01)
*G01N 21/3504* (2014.01)
*G06T 7/13* (2017.01)

(52) U.S. Cl.
CPC .......... *G01N 21/3504* (2013.01); *G06T 7/13* (2017.01); *G06T 2207/10048* (2013.01)

(58) Field of Classification Search
CPC ............... G06F 3/012; G02B 27/0172; H04N 5/23267; G06K 9/00268; G06T 7/85; G06T 7/246; G06T 7/593; G06T 7/13; G01N 21/3504; A41D 1/002; G09F 21/02
See application file for complete search history.

(56) References Cited

U.S. PATENT DOCUMENTS

| | | | |
|---|---|---|---|
| 8,928,796 B2 * | 1/2015 | Van Heugten | H04N 23/45 348/340 |
| 9,525,821 B2 | 12/2016 | Chang | |
| 11,022,546 B2 | 6/2021 | Schmidt et al. | |

(Continued)

FOREIGN PATENT DOCUMENTS

| | | |
|---|---|---|
| DE | 102010013377 A1 | 10/2011 |
| WO | 2008/118987 A1 | 10/2008 |

(Continued)

OTHER PUBLICATIONS

European search report Mailed on Apr. 11, 2023 for EP Application No. 22205569, 10 page(s).

(Continued)

*Primary Examiner* — Phuoc H Doan
(74) *Attorney, Agent, or Firm* — Alston & Bird LLP

(57) ABSTRACT

Methods, apparatuses, and systems for improving gas detecting apparatuses are provided. An example gas detecting apparatus may comprise at least one imaging sensor; and a controller component, wherein the controller component is configured to: obtain image data comprising at least a first frame and a second frame, identify a number of matching features between the first frame and the second frame, and in an instance in which the number of matching features satisfies a predetermined threshold number of matching features, estimate a transformation between the first frame and the second frame, and perform one or more vibration correction operations.

20 Claims, 8 Drawing Sheets

(56) References Cited

U.S. PATENT DOCUMENTS

2013/0028477 A1     1/2013   Schmieder et al.
2022/0284552 A1*   9/2022   Yang .......................... G06T 5/80

FOREIGN PATENT DOCUMENTS

WO     2017/031270 A1    2/2017
WO     2019/226908 A1    11/2019

OTHER PUBLICATIONS

Fonseca, L.M.G. et al., "Registration techniques for multisensor remotely sensed imagery," PE&R, 1049-1056, (Sept. 1, 1996).
Meribout, M., "Gas leak-detection and measurement systems: prospects and future trends," IEEE Transactions of Instrumentation and Measurement, 70:1-13, (Jul. 12, 2021).

* cited by examiner

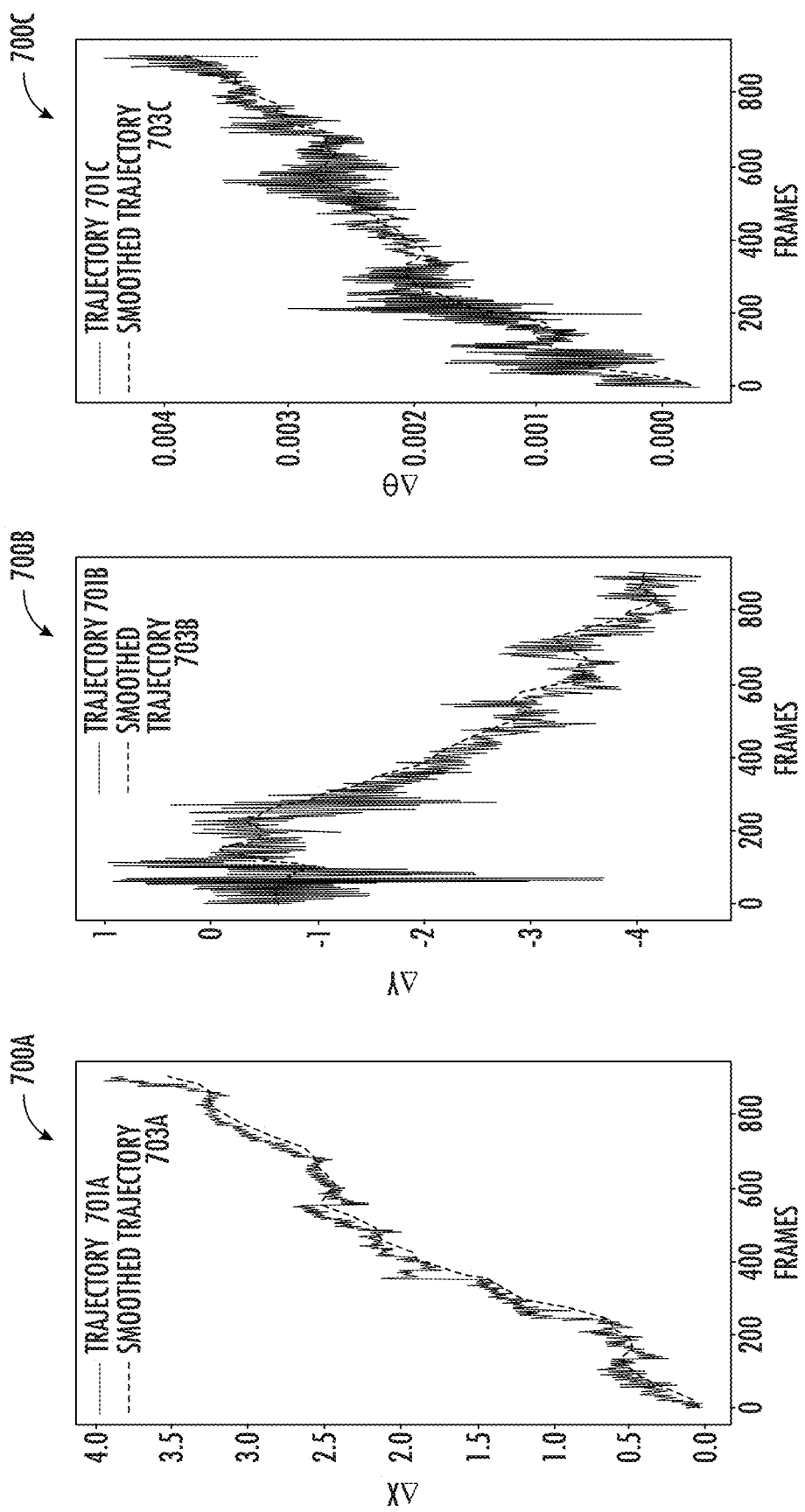

VIBRATION CORRECTION METHODS AND SYSTEMS FOR GAS DETECTING APPARATUSES

BACKGROUND

A gas detecting device (or a gas detector) refers to an apparatus that may detect, measure, and/or identify one or more gaseous substances in an environment. For example, a gas detecting device may detect a concentration level of a gaseous substance (also referred to as "target gaseous substance") in an area. Many gas detecting devices are plagued by technical challenges and limitations.

BRIEF SUMMARY

In accordance with various examples of the present disclosure, an example gas detecting apparatus may be provided.

In some examples, the gas detecting apparatus may comprise at least one imaging sensor and a controller component, wherein the controller component is configured to: obtain image data comprising at least a first frame and a second frame, identify a number of matching features between the first frame and the second frame, and in an instance in which the number of matching features satisfies a predetermined threshold number of matching features, estimate a transformation between the first frame and the second frame, and perform one or more vibration correction operations.

In some examples, an output of the one or more vibration correction operations is utilized to condition one or more video streams.

In some examples, the one or more vibration correction operations comprises generating a transformation matrix.

In some examples, the controller component is further configured to: determine vibration correction parameters/a second transformation matrix with respect to another imaging sensor of the gas detecting apparatus based at least in part on the transformation matrix.

In some examples, the at least one imaging sensor comprises a visible imaging sensor, and the another imaging sensor comprises a hyperspectral imaging sensor.

In some examples, the one or more vibration correction operations comprises at least one of a transformation operation, a smoothing operation and a border correction operation.

In some examples, the at least one imaging sensor comprises one or more of a visible imaging sensor and a hyperspectral imaging sensor.

In some examples, the controller component is further configured to: in an instance in which the number of matching features fails to satisfy the predetermined threshold number of matching features, generate a control indication to cause display of an alert or message.

In some examples, the number of matching features are associated with one or more points, one or more edges or one or more corners. In some examples, the gas detecting apparatus comprises a hyperspectral gas detecting apparatus.

In some embodiments, a method is provided, the method may comprise obtaining, via at least one imaging sensor of a gas detecting apparatus, image data comprising at least a first frame and a second frame, identifying, by a controller component, a number of matching features between the first frame and the second frame, and in an instance in which the number of matching features satisfies a predetermined threshold number of matching features, estimating, by the controller component, a transformation between the first frame and the second frame, and performing, by the controller component, one or more vibration correction operations.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative examples may be read in conjunction with the accompanying figures. It will be appreciated that, for simplicity and clarity of illustration, components and elements illustrated in the figures have not necessarily been drawn to scale, unless described otherwise. For example, the dimensions of some of the components or elements may be exaggerated relative to other elements, unless described otherwise. Examples incorporating teachings of the present disclosure are shown and described with respect to the figures presented herein, in which:

FIG. 7A is an example graph in accordance with various embodiments of the present disclosure;

FIG. 7B is an example graph in accordance with various embodiments of the present disclosure;

FIG. 7C is an example graph in accordance with various embodiments of the present disclosure;

DETAILED DESCRIPTION OF THE INVENTION

Figure 1:
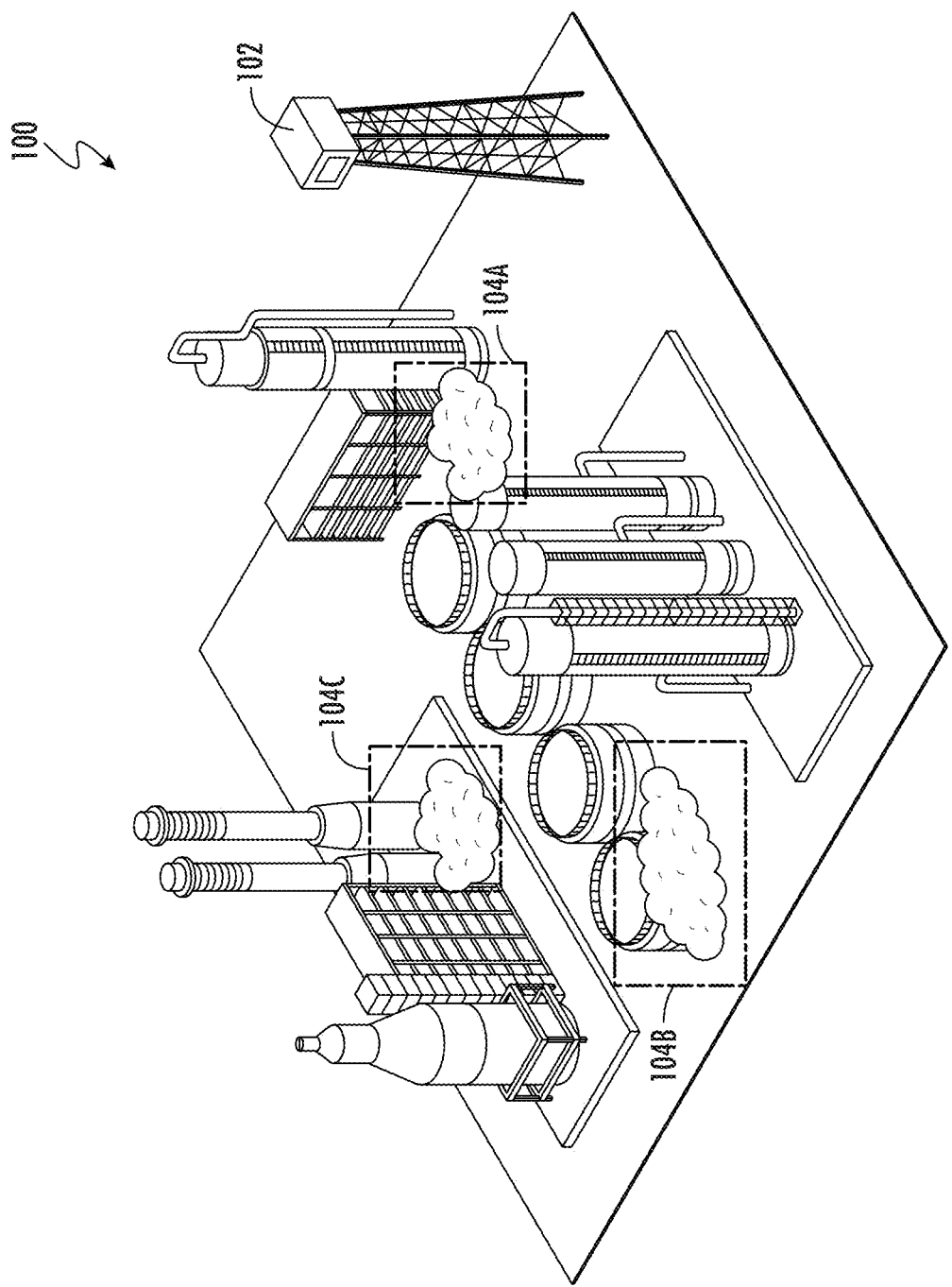
FIG. 1 is a schematic diagram depicting an operational example in accordance with various examples of the present disclosure.

Some examples of the present disclosure will now be described more fully hereinafter with reference to the accompanying drawings, in which some, but not all examples of the disclosure are shown. Indeed, these disclosures may be embodied in many different forms and should not be construed as limited to the examples set forth herein; rather, these examples are provided so that this disclosure will satisfy applicable legal requirements. Like numbers refer to like elements throughout.

The phrases "in one example," "according to one example," "in some examples," and the like generally mean that the particular feature, structure, or characteristic following the phrase may be included in at least one example of the present disclosure and may be included in more than one example of the present disclosure (importantly, such phrases do not necessarily refer to the same example).

If the specification states a component or feature "may," "can," "could," "should," "would," "preferably," "possibly," "typically," "optionally," "for example," "as an example," "in some examples," "often," or "might" (or other such language) be included or have a characteristic, that specific component or feature is not required to be included or to have the characteristic. Such component or feature may be optionally included in some examples, or it may be excluded.

The word "example" or "exemplary" is used herein to mean "serving as an example, instance, or illustration." Any implementation described herein as "exemplary" is not necessarily to be construed as preferred or advantageous over other implementations.

The term "electronically coupled," "electronically coupling," "electronically couple," "in communication with," "in electronic communication with," or "connected" in the present disclosure refers to two or more elements or components being connected through wired means and/or wireless means, such that signals, electrical voltage/current, data and/or information may be transmitted to and/or received from these elements or components.

The term "hyperspectral image data" or "hyperspectral cube" may refer to image data that is associated with a plurality of bands across the electromagnetic spectrum (e.g., infrared, visible light spectrum, x-rays, ultraviolet, combinations thereof, and/or the like). In some examples, a hyperspectral cube may capture a plurality of wavelength bands for each pixel in an image.

Various examples of the present disclosure may provide example technical improvements on the performance of gas detecting apparatuses. Gas detecting apparatuses may be configured to quantify, detect, measure, and/or identify a concentration level of one or more target gaseous substances in a particular area or location. In particular, gas detecting apparatuses may be utilized in environments where there is a high risk of gas leaks that may result in fires, explosions and/or acute toxic exposure such as processing facilities, manufacturing plants, petrochemical plants, and the like. One example of a gas detecting apparatus is as a hyperspectral gas detecting apparatus. An example hyperspectral gas detecting apparatus may comprise one or more imaging sensors (e.g., cameras) that are configured to obtain and analyze raw image/video data (e.g., hyperspectral image data and visible image data) associated with one or more spectral bands (e.g., infrared, visible light) of the electromagnetic spectrum. In some examples, the hyperspectral gas detecting apparatus may be configured to detect one or more gaseous substances including, but not limited to, acetic acid, Ammonia, Benzene, Butadiene, Butane, Ethane, Ethanol, Ethylene, Iso-Butylene, Iso-Pentane, Methane, Methanol, N-Pentane, Propane, Propylene, Toluene, Vinyl Chloride, p- or m-Xylene, and/or the like.

Referring now to FIG. 1, a schematic diagram depicting an operational example 100 in accordance with various embodiments of the present disclosure is provided. As illustrated in FIG. 1, a gas detecting apparatus 102 (e.g., hyperspectral gas detecting apparatus) may be positioned within a location in order to monitor an environment (e.g., as depicted, a processing plant) for one or more target gaseous substances. In various embodiments, at least a portion of the gas detecting apparatus 102 is moveable with respect to a fixed location such that the gas detecting apparatus can move, rotate, pan, tilt, and/or the like) to facilitate monitoring of a plurality of target areas within the environment. As illustrated, the example gas detecting apparatus 102 is configured to monitor at least first target area 104A, a second target area 104B, and a third target area 104C. In various embodiments, the gas detecting apparatus 102 is configured to generate a calibrated image/video stream using a particular light source (e.g., blackbody radiation, infrared radiation, and/or the like) in order to detect an absorption signature of one or more target gaseous substances.

In various examples, gas detecting apparatuses (e.g., hyperspectral gas detecting apparatuses) may vibrate (e.g., shake) during operations due to environmental conditions (e.g., wind, unsteady mounting structures, and/or the like) which may result in intensification of noise in hyperspectral data/images (e.g., infrared image data) obtained by such gas detecting apparatuses. Consequently, this may lead to overestimations (e.g., false positives) or underestimations (e.g., false negatives) of a detected concentration level of a target gaseous substance. In some examples, false positives can increase the costs of facility inspections for end users and customers. Additionally, in some examples, false negatives may result in target gaseous substances being undetected creating a safety hazard which may lead to environmental fines and product waste. Accordingly, both overestimations and underestimations with respect to the detection of target gaseous substances may have a detrimental effect on detection accuracy and operational efficiency.

In accordance with various embodiments of the present disclosure, example methods, apparatuses, computer program products, and systems are provided.

In some embodiments, a gas detecting apparatus is provided. The gas detecting apparatus may comprise at least one imaging sensor and a controller component, wherein the controller component is configured to: obtain image data comprising at least a first frame and a second frame, identify a number of matching features between the first frame and the second frame, and in an instance in which the number of matching features satisfies a predetermined threshold number of matching features, estimate a transformation between the first frame and the second frame, and perform one or more vibration correction operations. In some examples, an output of the one or more vibration correction operations is utilized to condition one or more video streams. In some examples, the one or more vibration correction operations comprises generating a transformation matrix. In some examples, the controller component is further configured to: determine vibration correction parameters/a second transformation matrix with respect to another imaging sensor of the gas detecting apparatus based at least in part on the transformation matrix. In some examples, the at least one imaging sensor comprises a visible imaging sensor, and the another imaging sensor comprises a hyperspectral imaging sensor. In some examples, the one or more vibration correction operations comprises at least one of a transformation operation, a smoothing operation and a border correction operation. In some examples, the at least one imaging sensor comprises one or more of a visible imaging sensor and a hyperspectral imaging sensor. In some examples, the controller component is further configured to: in an instance in which the number of matching features fails to satisfy the predetermined threshold number of matching features, generate a control indication to cause display of an alert or message. In some examples, the number of matching features are associated with one or more points, one or more edges or one or more corners. In some examples, the gas detecting apparatus comprises a hyperspectral gas detecting apparatus.

In some embodiments, a method is provided, the method may comprise obtaining, via at least one imaging sensor of a gas detecting apparatus, image data comprising at least a first frame and a second frame, identifying, by a controller component, a number of matching features between the first frame and the second frame, and in an instance in which the number of matching features satisfies a predetermined threshold number of matching features, estimating, by the controller component, a transformation between the first frame and the second frame, and performing, by the controller component, one or more vibration correction operations. In some examples, an output of the one or more vibration correction operations is utilized to condition one or more video streams. In some examples, the one or more vibration correction operation comprises generating a transformation matrix. In some examples, the controller component is further configured to: determine vibration correction parameters/a second transformation matrix with respect to another imaging sensor of the gas detecting apparatus based at least in part on the transformation matrix. In some examples, the at least one imaging sensor comprises a visible imaging sensor, and the another imaging sensor comprises a hyperspectral imaging sensor. In some examples, the one or more vibration correction operations comprise at least one of a transformation operation, a smoothing operation and a border correction operation. In some examples, the at least one imaging sensor comprises one or more of a visible imaging sensor and a hyperspectral imaging sensor. In some examples, in an instance in which the number of matching features fails to satisfy the predetermined threshold number of matching features, generate a control indication to cause display of an alert or message. In some examples, the number of matching features are associated with one or more points, one or more edges or one or more corners. In some examples, the gas detecting apparatus comprises a hyperspectral gas detecting apparatus.

Utilizing the techniques disclosed herein, a workflow for detecting and correcting vibration in image data (e.g., hyperspectral image data) in order to provide more accurate results and reduce false positive and false negative readings is provided. The noted techniques improve the reliability of gas detecting apparatuses (e.g., hyperspectral gas detecting apparatuses) when quantifying target gaseous substances and are, in some examples, up to five times and seven times more accurate than conventional techniques. As a result of reduced false positives, site inspections and incident costs may be reduced. Moreover, identified gas leakages can be repaired quickly and efficiently thus circumventing safety issues, product waste and environmental fines.

Figure 2:
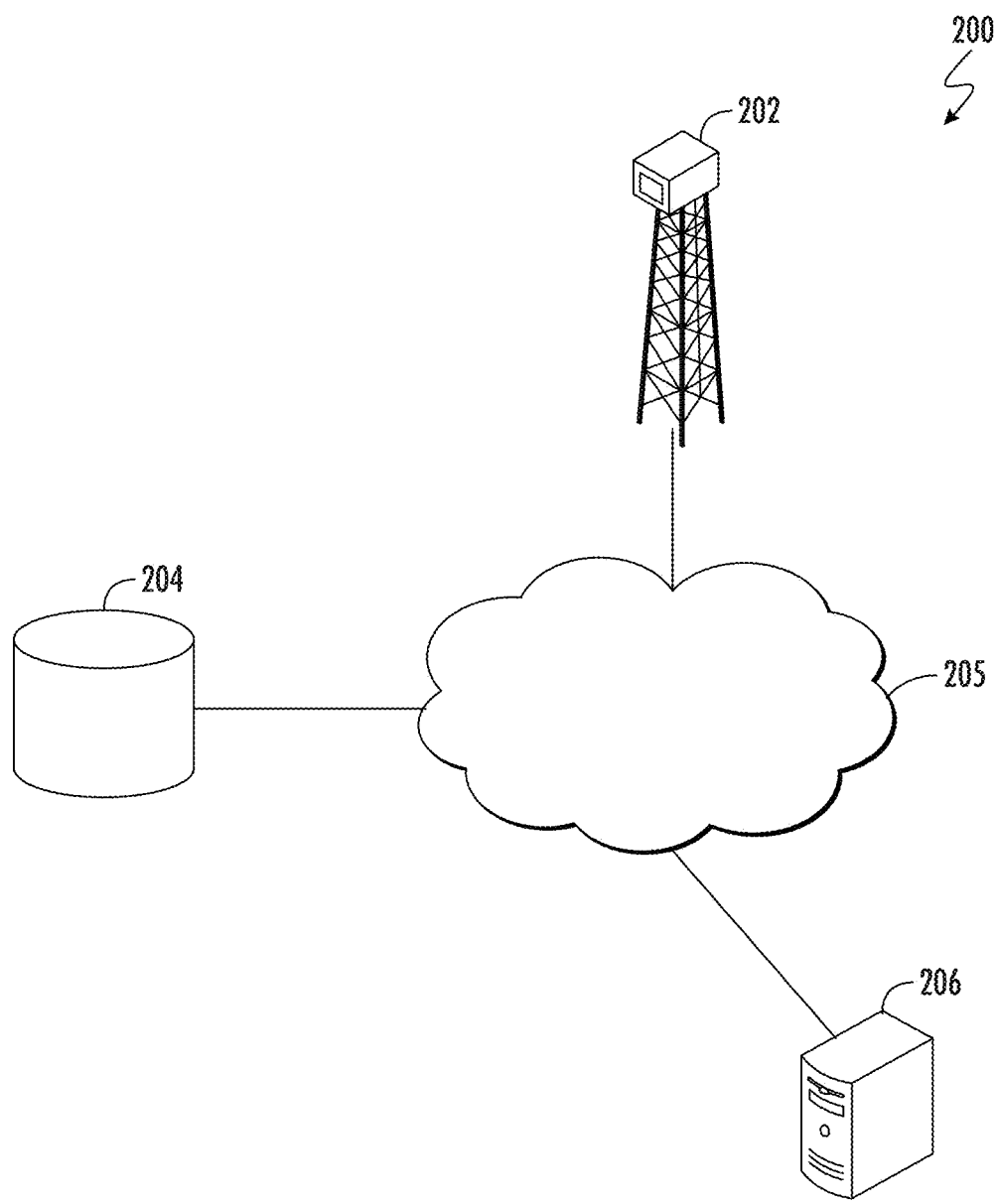
FIG. 2 is a schematic diagram depicting an example system in accordance with various examples of the present disclosure.

Referring now to FIG. 2, an example schematic diagram depicting an example system 200 in accordance various embodiments of the present disclosure is provided. As depicted, the example system 200 comprises a gas detecting apparatus 202, one or more computing entities 206 (e.g., servers), one or more databases 204, one or more networks 205, and/or the like. In various examples, the system 200 may operate to facilitate monitoring of one or more target gaseous substances within a particular location or environment.

In various embodiments, the gas detecting apparatus 202 may be or comprise a hyperspectral gas detecting apparatus that is configured to obtain image data (e.g., video streams) within a location. In some examples, the gas detecting apparatus 202 may capture image data at a rate of 15 images per second. As discussed above in connection to FIG. 1, the example gas detecting apparatus 202 may be stationary (e.g., mounted on a platform, tower, support structure, and/or the like). In various embodiments, the gas detecting apparatus 202, the one or more databases 204, and/or the one or more user computing entities 108 (e.g., servers) are in electronic communication with each other over the one or more networks 205 such that they can exchange data (e.g., receive and transmit data) with one another (e.g., periodically, and/or in response to requests). Each of the components of the system 200, including the gas detecting apparatus 202, the one or more computing entities 206, and/or the one or more databases 204, may be in communication with one another over the same or different wireless or wired networks 205 including, for example, a wired or wireless Personal Area Network (PAN), Local Area Network (LAN), Metropolitan Area Network (MAN), Wide Area Network (WAN), cellular network, and/or the like. While FIG. 2 illustrates certain system components as separate, stand-alone devices, the various embodiments are not limited to this particular architecture.

As depicted in FIG. 2, the example system 200 comprises one or more computing entities 206. In general, the terms computing device, entity, device, system, and/or similar words used herein interchangeably may refer to, for example, one or more computers, computing devices, computing entities, desktop computers, mobile phones, tablets, phablets, notebooks, laptops, distributed systems, terminals, servers or server networks, blades, gateways, switches, processing devices, set-top boxes, relays, routers, network access points, base stations, the like, and/or any combination of devices adapted to perform the functions, operations, and/or processes described herein. Such functions, operations, and/or processes may include, for example, transmitting, receiving, operating on, processing, displaying, storing, determining, generating/creating, monitoring, evaluating, comparing, and/or similar terms used herein interchangeably. In one embodiment, these functions, operations, and/or processes can be performed on data, content, information, and/or similar terms used herein interchangeably.

In some examples, the computing entity 206 may also include one or more network and/or communications interfaces for communicating with various computing entities, such as by communicating data, content, information, and/or similar terms used herein interchangeably that can be transmitted, received, operated on, processed, displayed, stored, and/or the like.

In one embodiment, the computing entity 206 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the computing entity 206 may further include or be in communication with volatile media (also referred to as volatile storage, memory, memory storage, memory circuitry and/or similar terms used herein interchangeably). In one embodiment, the volatile storage or memory may also include one or more volatile storage or memory media as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element. Thus, the databases, database instances, database management system entities, data, applications, programs, program modules, scripts, source code, object code, byte code, compiled code, interpreted code, machine code, executable instructions, and/or the like may be used to control certain aspects of the operation of the computing entity 206 with the assistance of the processing element and the operating system.

As indicated, in one embodiment, the computing entity 206 may also include one or more network and/or communications interfaces for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, computing entity 206 may be configured to communicate via wireless external communication networks using any of a variety of protocols, such as general packet radio service (GPRS), Universal Mobile Telecommunications System (UMTS), Code Division Multiple Access 200 (CDMA200), CDMA200 1X (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), IR protocols, NFC protocols, RFID protocols, IR protocols, ZigBee protocols, Z-Wave protocols, 6LoWPAN protocols, Wibree, Bluetooth protocols, wireless universal serial bus (USB) protocols, and/or any other wireless protocol. The computing entity 206 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the computing entity's 206 components may be located remotely from other computing entity 206 components, such as in a distributed system. Furthermore, one or more of the components may be aggregated and additional components performing functions described herein may be included in the computing entity 206. Thus, the computing entity 206 can be adapted to accommodate a variety of needs and circumstances, such as including various components described with regard to a mobile application executing on a user computing entity, including various input/output interfaces.

As depicted in FIG. 2, any two or more of the illustrative components of the system 200 of FIG. 2 may be configured to communicate with one another via one or more networks 205. The networks 205 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 205 may have any suitable communication range associated therewith and may include, for example, global networks (e.g., the Internet), MANs, WANs, LANs, or PANs. In addition, the networks 205 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

While FIG. 2 provides an example system 200, it is noted that the scope of the present disclosure is not limited to the example shown in FIG. 2. In some examples, the system 200 may comprise one or more additional and/or alternative elements, and/or may be different from that illustrated in FIG. 2.

Figure 3:
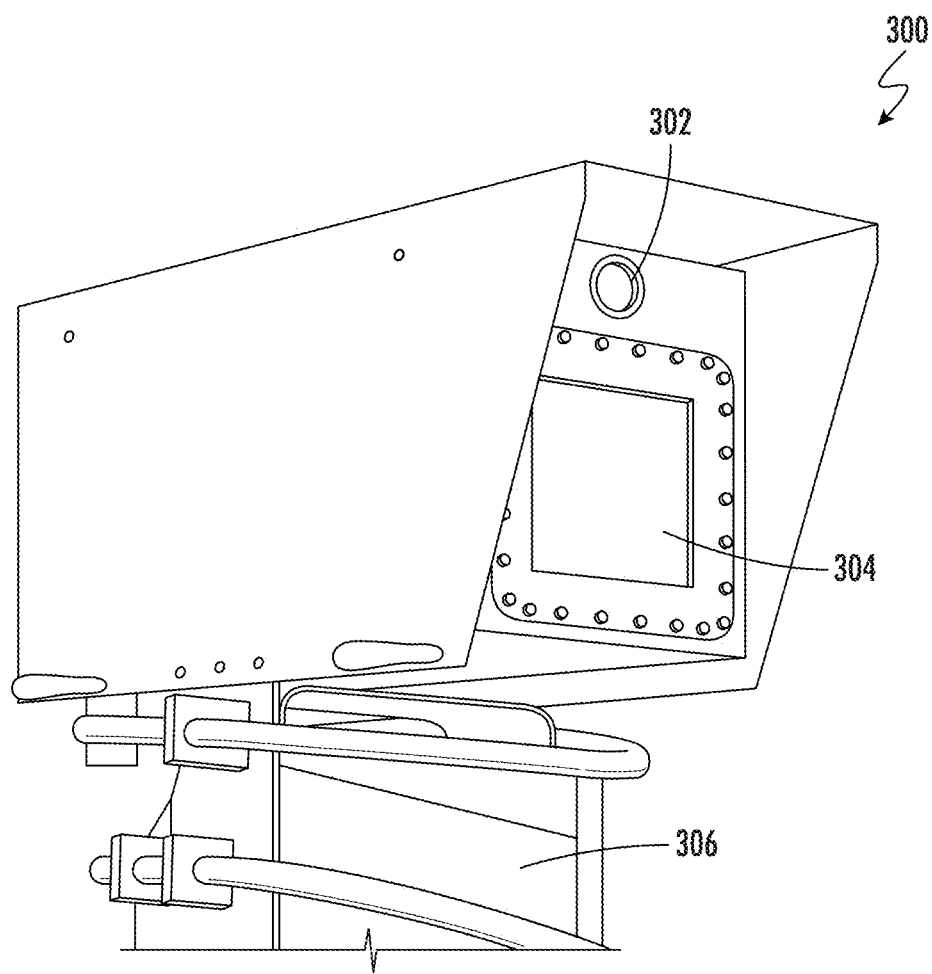
FIG. 3 is a schematic diagram depicting an example gas detecting apparatus in accordance with various examples of the present disclosure.

Referring now to FIG. 3, a schematic diagram depicting an example gas detecting apparatus 300 (e.g., hyperspectral gas detecting apparatus) in accordance various embodiments of the present disclosure is provided. As depicted, the example gas detecting apparatus 300 comprises a housing configured to contain one or more elements/components of the gas detecting apparatus 300.

As depicted in FIG. 3, the gas detecting apparatus 300 comprises at least one visible imaging sensor 302 (e.g., an RGB camera) and at least one hyperspectral imaging sensor 304. In various embodiments, the gas detecting apparatus 300 is configured to obtain/monitor image data (e.g., infrared image data, visible image data, combinations thereof, and/or the like) via the at least one visible imaging sensor 302 and the at least one hyperspectral imaging sensor 304. In various examples, the gas detecting apparatus 300 is be configured to generate a calibrated image using a particular light source (e.g., blackbody radiation, infrared radiation, and/or the like) in order to detect an absorption signature of one or more target gaseous substances.

As further depicted in FIG. 3, the gas detecting apparatus 300 comprises a pan-tilt unit 306 that operates to enable movement (e.g., rotations and/or tilts) of the gas detecting apparatus 300 (e.g., in some examples, 360 degree rotations and/or up to a 45 degree tilt) and facilitate monitoring more than one target area within a particular location. In some embodiments, the example gas detecting apparatus 300 may be mounted on a fixed/stationary support structure (e.g., tower, base, frame, interior building surface, and/or the like) within an environment.

While FIG. 3 provides an example gas detecting apparatus 300, it is noted that the scope of the present disclosure is not limited to the example shown in FIG. 3. In some examples, the gas detecting apparatus 300 may comprise one or more additional and/or alternative elements, and/or may be different from that illustrated in FIG. 3.

Figure 4:
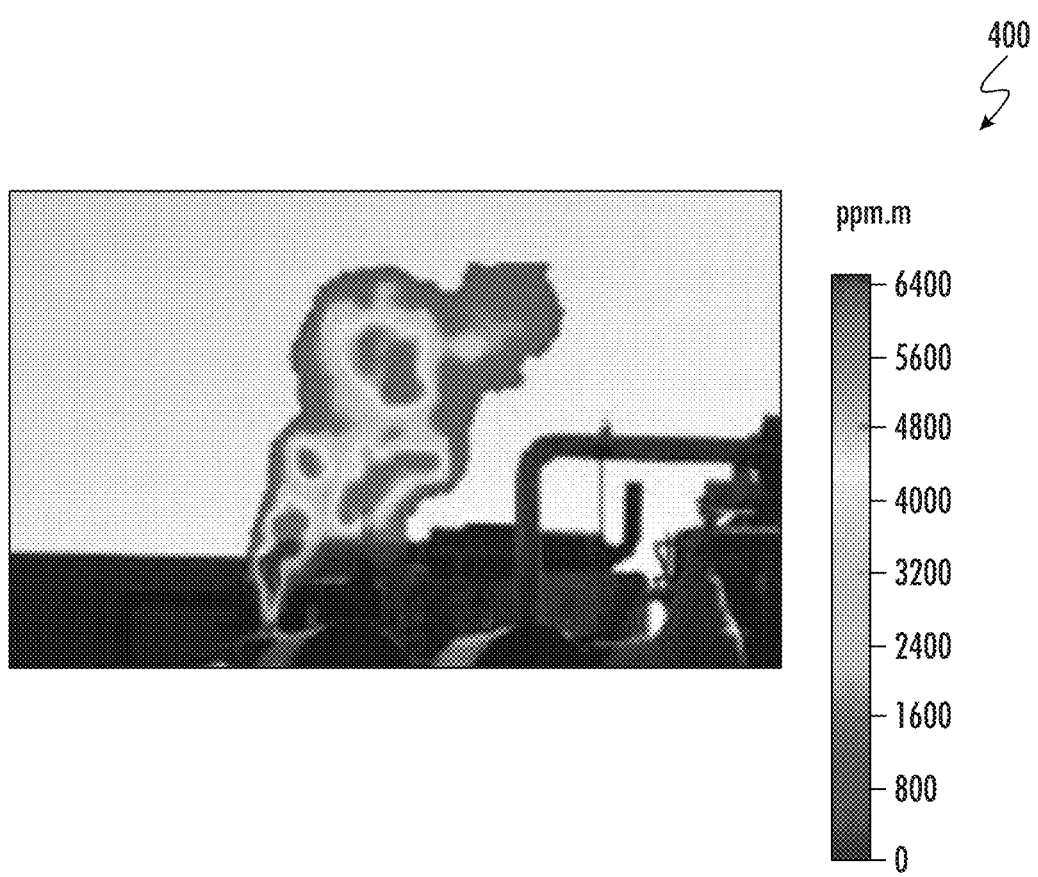
FIG. 4 is a schematic diagram depicting an example image in accordance various embodiments of the present disclosure.

Referring now to FIG. 4, a schematic diagram depicting an example hyperspectral image 400 in accordance various embodiments of the present disclosure is provided. The hyperspectral image 400 may be an output of a gas detecting apparatus, such as the gas detecting apparatus 300 discussed above in connection with FIG. 3. As depicted in FIG. 4, the hyperspectral image 400 depicts a gaseous plume (e.g., flare) indicative of the presence and concentration (as depicted, in parts per million by mass (ppmm)) of a target gaseous substance.

Figure 5:
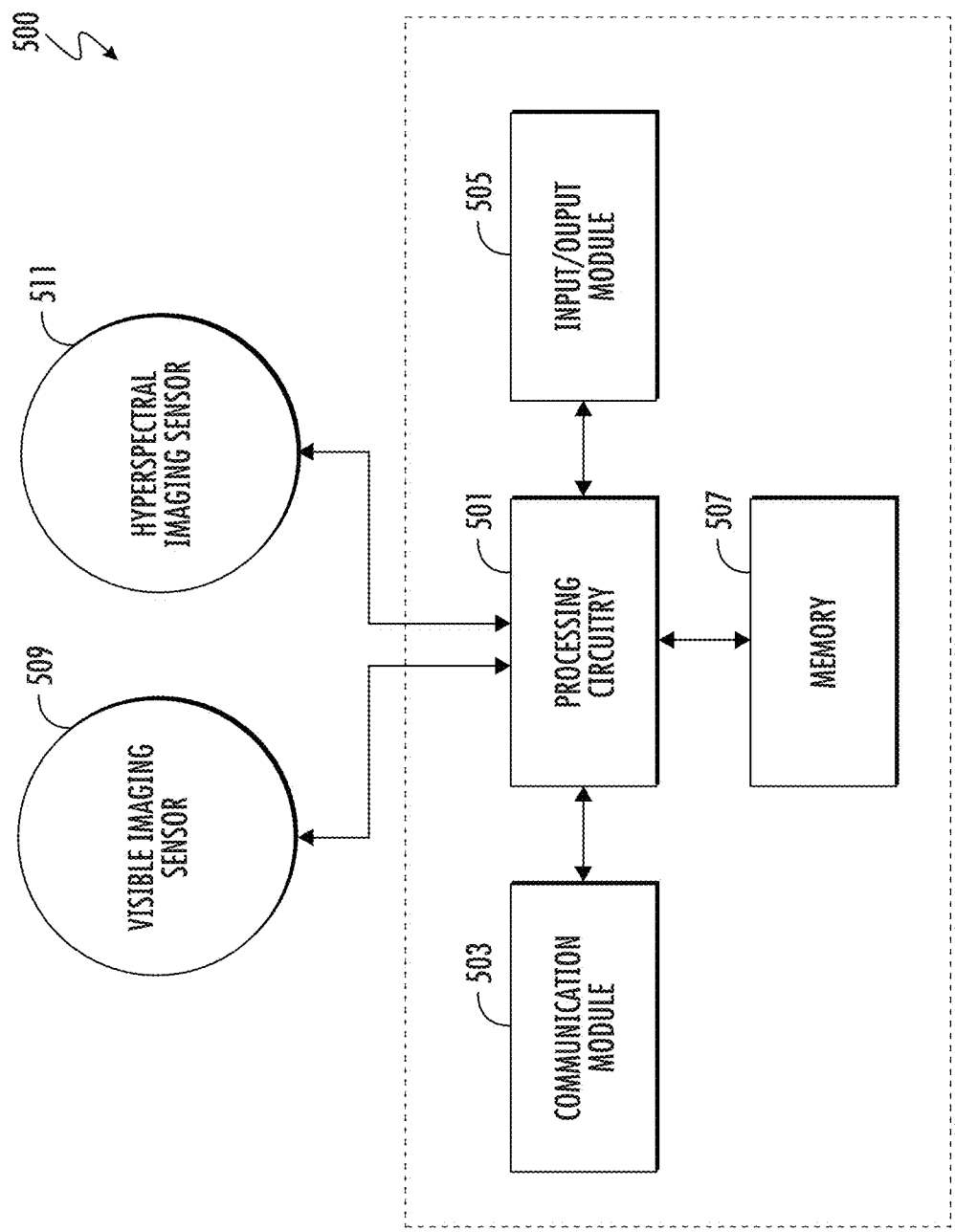
FIG. 5 illustrates an example controller component in accordance with various embodiments of the present disclosure.

Referring now to FIG. 5, a schematic diagram depicting an example controller component 500 of an example gas detecting apparatus in electronic communication with various other components in accordance with various embodiments of the present disclosure. As shown, the controller component 500 comprises processing circuitry 501, a communication module 503, input/output module 505, a memory 507, and/or other components configured to perform various operations, procedures, functions or the like described herein.

As shown, the controller component 500 (such as the processing circuitry 501, communication module 503, input/output module 505 and memory 507) is electrically coupled to and/or in electronic communication with at least a visible imaging sensor 509 and a hyperspectral imaging sensor 511. As depicted, the at least one visible imaging sensor 509 and a hyperspectral imaging sensor 511 may exchange (e.g., transmit and receive) data with the processing circuitry 501 of the controller component 500.

The processing circuitry 501 may be implemented as, for example, various devices comprising one or a plurality of microprocessors with accompanying digital signal processors; one or a plurality of processors without accompanying digital signal processors; one or a plurality of coprocessors; one or a plurality of multi-core processors; one or a plurality of controllers; processing circuits; one or a plurality of computers; and various other processing elements (including integrated circuits, such as ASICs or FPGAs, or a certain combination thereof). In some embodiments, the processing circuitry 501 may comprise one or more processors. In one exemplary embodiment, the processing circuitry 501 is configured to execute instructions stored in the memory 507 or otherwise accessible by the processing circuitry 501. When executed by the processing circuitry 501, these instructions may enable the controller component 500 to execute one or a plurality of the functions as described herein. No matter whether it is configured by hardware, firmware/software methods, or a combination thereof, the processing circuitry 501 may comprise entities capable of executing operations according to the embodiments of the present invention when correspondingly configured. Therefore, for example, when the processing circuitry 501 is implemented as an ASIC, an FPGA, or the like, the processing circuitry 501 may comprise specially configured hardware for implementing one or a plurality of operations described herein. Alternatively, as another example, when the processing circuitry 501 is implemented as an actuator of instructions (such as those that may be stored in the memory 507), the instructions may specifically configure the processing circuitry 501 to execute one or a plurality of algorithms and operations described herein, such as those discussed with reference to FIG. 5.

The memory 507 may comprise, for example, a volatile memory, a non-volatile memory, or a certain combination thereof. Although illustrated as a single memory in FIG. 5, the memory 507 may comprise a plurality of memory components. In various embodiments, the memory 507 may comprise, for example, a hard disk drive, a random access memory, a cache memory, a flash memory, a Compact Disc Read-Only Memory (CD-ROM), a Digital Versatile Disk Read-Only Memory (DVD-ROM), an optical disk, a circuit configured to store information, or a certain combination thereof. The memory 507 may be configured to store information, data, application programs, instructions, and etc., so that the controller component 500 can execute various functions according to the embodiments of the present disclosure. For example, in at least some embodiments, the memory 507 is configured to cache input data for processing by the processing circuitry 501. Additionally or alternatively, in at least some embodiments, the memory 507 is configured to store program instructions for execution by the processing circuitry 501. The memory 507 may store information in the form of static and/or dynamic information. When the functions are executed, the stored information may be stored and/or used by the controller component 500.

The communication module 503 may be implemented as any apparatus included in a circuit, hardware, a computer program product or a combination thereof, which is configured to receive and/or transmit data from/to another component or apparatus. The computer program product comprises computer-readable program instructions stored on a computer-readable medium (for example, the memory 507) and executed by a controller component 500 (for example, the processing circuitry 501). In some embodiments, the communication module 503 (as with other components discussed herein) may be at least partially implemented as the processing circuitry 501 or otherwise controlled by the processing circuitry 501. In this regard, the communication module 503 may communicate with the processing circuitry 501, for example, through a bus. The communication module 503 may comprise, for example, antennas, transmitters, receivers, transceivers, network interface cards and/or supporting hardware and/or firmware/software, and is used for establishing communication with another apparatus. The communication module 503 may be configured to receive and/or transmit any data that may be stored by the memory 507 by using any protocol that can be used for communication between apparatuses. The communication module 503 may additionally or alternatively communicate with the memory 507, the input/output module 505 and/or any other component of the controller component 500, for example, through a bus.

In some embodiments, the controller component 500 may comprise an input/output module 505. The input/output module 505 may communicate with the processing circuitry 501 to receive instructions input by the user and/or to provide audible, visual, mechanical or other outputs to the user. Therefore, the input/output module 505 may comprise supporting devices, such as a keyboard, a mouse, a display, a touch screen display, and/or other input/output mechanisms. Alternatively, at least some aspects of the input/ output module 505 may be implemented on a device used by the user to communicate with the controller component 500. The input/output module 505 may communicate with the memory 507, the communication module 503 and/or any other component, for example, through a bus. One or a plurality of input/output modules and/or other components may be included in the controller component 500.

For example, the at least one visible imaging sensor 509 and hyperspectral imaging sensor 511 may be similar to the at least one visible imaging sensor 302 and the at least one hyperspectral imaging sensor 304 described above with regard to FIG. 3. For example, the at least one visible imaging sensor 509 and hyperspectral imaging sensor 511 may obtain image data for generation of image data/video streams that are indicative of a concentration level of one or more target gaseous substances.

Figure 6:
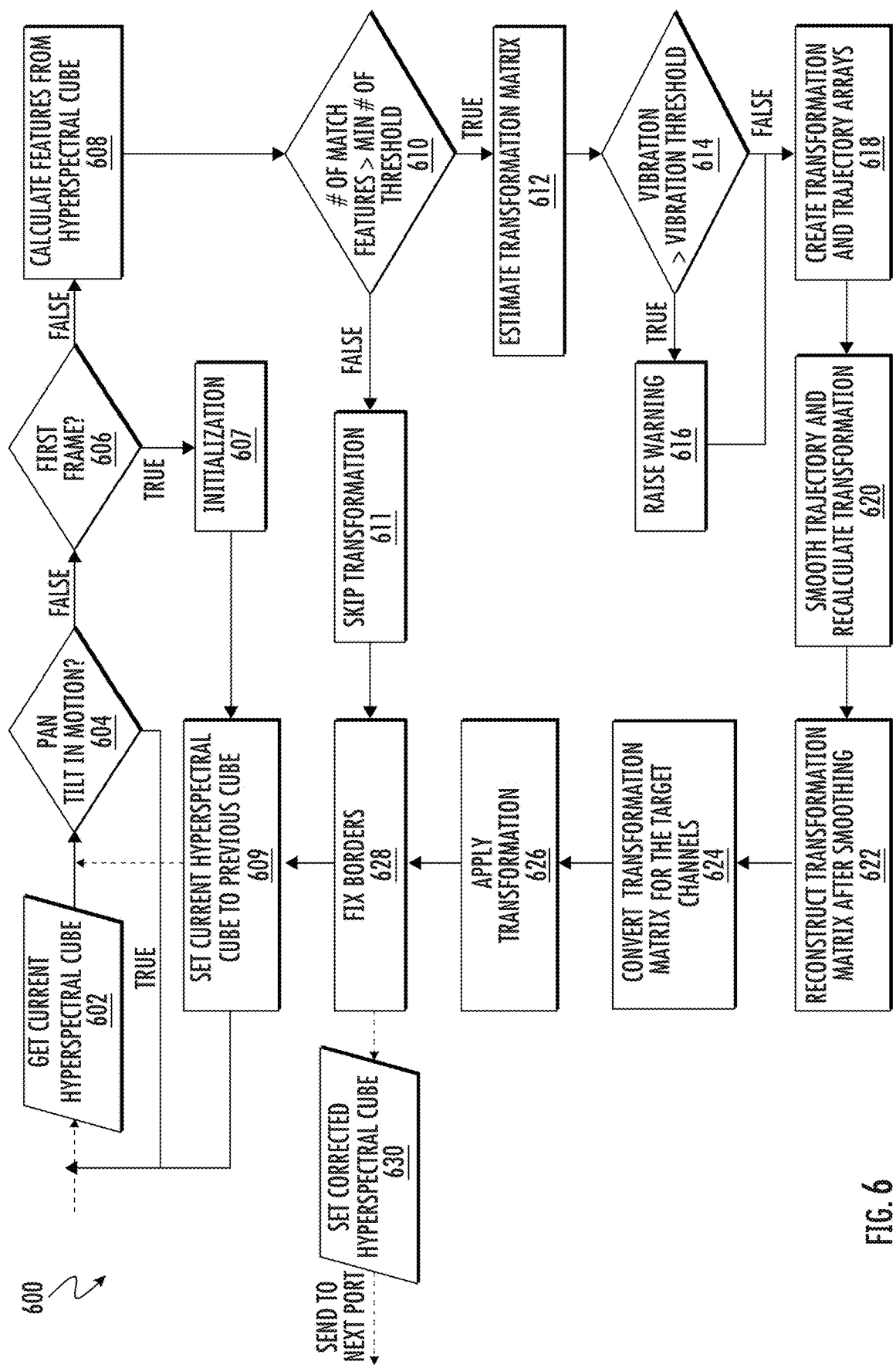
FIG. 6 is a flowchart diagram illustrating example operations in accordance with various embodiments of the present disclosure.

Referring now to FIG. 6, a flowchart diagram illustrating example operations 600 in accordance with various embodiments of the present disclosure is provided. The described operations may lead to performing one or more vibration correction operations.

In some examples, the method 600 may be performed by a processing circuitry (for example, but not limited to, an application-specific integrated circuit (ASIC), a central processing unit (CPU)). In some examples, the processing circuitry may be electrically coupled to and/or in electronic communication with other circuitries of the example apparatus, such as, but not limited to, a gas detecting apparatus, a memory (such as, for example, random access memory (RAM) for storing computer program instructions), and/or a display circuitry (for rendering readings on a display).

In some examples, one or more of the procedures described in FIG. 6 may be embodied by computer program instructions, which may be stored by a memory (such as a non-transitory memory) of a system employing an embodiment of the present disclosure and executed by a processing circuitry (such as a processor) of the system. These computer program instructions may direct the system to function in a particular manner, such that the instructions stored in the memory circuitry produce an article of manufacture, the execution of which implements the function specified in the flow diagram step/operation(s). Further, the system may comprise one or more other circuitries. Various circuitries of the system may be electronically coupled between and/or among each other to transmit and/or receive energy, data and/or information.

In some examples, embodiments may take the form of a computer program product on a non-transitory computer-readable storage medium storing computer-readable program instruction (e.g., computer software). Any suitable computer-readable storage medium may be utilized, including non-transitory hard disks, CD-ROMs, flash memory, optical storage devices, or magnetic storage devices.

The example method 600 begins at step/operation 602. At step/operation 602, processing circuitry (such as, but not limited to, the processing circuitry 501 of the controller component 500 illustrated in connection with FIG. 5, discussed above) obtains a current hyperspectral cube comprising image data (e.g., visible imaging sensor data, hyperspectral imaging sensor data (infrared data and/or blackbody radiation data), and combinations thereof), via a gas detecting apparatus (such as, but not limited to, gas detecting apparatus 300 described above in connection with FIG. 3). In various examples, the image data may be or comprise an ordered sequence of a plurality of frames (i.e., images).

Subsequent to step/operation 602, the method 600 proceeds to step/operation 604. At step/operation 604, processing circuitry determines whether or not the gas detecting apparatus is in motion (e.g., such as by determining whether pan-tilt unit 306 described above is in motion). In an instance in which the processing circuitry determines that the gas detecting apparatus is in motion, the processing circuitry may proceed to obtain image data at a subsequent instance in time at step/operation 602. In an instance in which the processing circuitry determines that the gas detecting apparatus is not in motion, the method 600 proceeds to step/operation 606. In other words, processing circuity may determine that vibration correction operations are not required when the gas detecting apparatus is in motion.

At step/operation 606, processing circuitry determines whether the hyperspectral cube/image data comprises a first frame. In an instance in which the processing circuitry determines that the hyperspectral cube/image data comprises a first frame, the method 600 proceeds to initialization of vibration correction operations at step/operation 607. As depicted, proceeding with step/operation 609, processing circuitry sets the current frame to a previous frame and obtains a subsequent frame at step/operation 602. Returning to step/operation 606, in an instance in which the processing circuitry determines that the hyperspectral cube/image data comprises more than the first frame (e.g., a first frame and a second frame), the method 600 proceeds to step/operation 608.

At step/operation 608, processing circuitry determines/identifies one or more features based at least in part on the hyperspectral cube/image. By way of example, processing circuity may identify prominent matching features (e.g., distinguishing features such as points, corners, and/or edges) between two consecutive frames (i.e., the previous frame and the current frame discussed above).

Subsequent to step/operation 608, the method 600 proceeds to step/operation 610. At step/operation 610, processing circuitry determines whether a predetermined threshold number of matching features between the first frame and the second frame is satisfied (by meeting or exceeding the predetermined threshold number of matching features). Said differently, processing circuitry determines whether there is a required number of matching features between the first frame and the second frame for determining a transformation change between the respective frames. By way of example, the predetermined threshold number of matching features may be 10, 15, or the like. In some examples, the predetermined threshold number of matching features may be a user selected configurable threshold. In an instance in which the processing circuitry determines that the predetermined threshold number of matching features is not satisfied, the method 600 proceeds to step/operation 611 where processing circuitry will skip or not perform a subsequent transformation. In some embodiments, step/operation 611 may comprise generating a control indication to cause display of a message or alert (e.g., for example, the message "NOT enough matching features were found for vibration correction") via a user interface. Subsequent to step/operation 611, the method 600 may proceed to step/operation 628 and processing circuitry will perform border correction operations in order to fix (e.g., adjust, correct) borders in the frames and provide the updated frames/corrected hyperspectral cube for further operations at step/operation 630.

In an instance in which the processing circuitry determines that the predetermined threshold number of matching features is satisfied, the method 600 proceeds to step/operation 612 and processing circuitry estimates a transformation matrix (e.g., motion) between the first frame and the second frame (i.e., the previous frame and the current frame). As described herein, the term transformation may refer to a mapping method that preserves points, lines and/or planes that can be utilized to correct for distortions and/or deformations in image data. For example, processing circuitry may determine changes in displacement in three dimensions (e.g., $\Delta x$, $\Delta y$, and $\Delta z$) between the first frame and the second frame. Then, the method 600 proceeds to step/operation 614 where processing circuitry determines whether or not the detected displacement in each of the three dimensions is above a predetermined vibration threshold by meeting or exceeding a predetermined value/amount (e.g., 1 pixel or above in at least one dimension). If processing circuitry detects an above-threshold amount of vibration, the method 600 proceeds to step/operation 616 where processing circuitry may generate a control indication to cause display of a message or alert via a user interface and/or store a corresponding record in memory (e.g., a log file). Subsequently, the method 600 proceeds to step/operation 618.

At step/operation 618, processing circuitry performs one or more transformation operations. For example, processing circuitry may generate/create and append a transformation/trajectory array for stabilizing the output generated by the gas detecting apparatus. Said differently, processing circuitry determines an amount of cumulative change with respect to the first frame and the second frame which may be used to correct a hyperspectral cube/image data associated with the gas detecting apparatus.

Subsequent to step/operation 618, the method 600 proceeds to step/operation 620. At step/operation 620, processing circuitry smooths the trajectory array (e.g., using a moving average method) and recalculates the transformation. In some examples, processing circuitry utilizes a predetermined window size and recalculates a new transformation from the smoothed trajectory.

Subsequent to step/operation 620, the method 600 proceeds to step/operation 622. At step/operation 622, processing circuitry reconstructs the transformation matrix after smoothing from the newly calculated transformation.

Subsequent to step/operation 622, the method 600 proceeds to step/operation 624. At step/operation 624, in some embodiments, processing circuitry converts the transformation matrix for one or more target channels (e.g., visible imaging transformation matrix to infrared and blackbody radiation transformation matrices). By way of example, the gas detecting may comprise at least one visible imaging sensor and at least one hyperspectral imaging sensor. Accordingly, because the location of each imaging sensor is constant relative to one or more other imaging sensors, vibration correction parameters determined and utilized for image data captured one imaging sensor can be used to determine vibration correction parameters for another imaging sensor. Thus, step/operation 624 may be performed in order to account for different pixel sizes and/or focal lengths of various imaging sensors.

Subsequent to step/operation 624, the method 600 proceeds to step/operation 626. At step/operation 626, processing circuitry applies a transformation using the new transformation matrices. Then, the method 600 proceeds to 628 and processing circuitry performs border correction operations in order to fix (e.g., adjust, correct) borders. In some embodiments after stabilization, there may be black boundary artifacts (e.g., due to shrinking or scaling of frames). Accordingly, processing circuity may re-scale the output with respect to its center by a predetermined amount (e.g., 4%).

Then, at step/operation 630, processing circuitry provides the corrected hyperspectral cube comprising the stabilized image data/corrected frames (e.g., infrared image data, visible image data, and/or blackbody radiation data) for further operations within an image processing pipeline (e.g., another port for further computations) that can be utilized for detecting one or more target gaseous substances. The determined corrections may be applied to condition an output of one or more video streams. Additionally, as described above, vibration compensation parameters determined for a first imaging sensor may be utilized to determine vibration compensation parameters for one or more other imaging sensors.

While FIG. 6 provides an example method 600, it is noted that the scope of the present disclosure is not limited to the example shown in FIG. 6. In some examples, the method 600 may comprise one or more additional and/or alternative steps/operations, and/or may be different from that illustrated in FIG. 6.

Referring now to FIG. 7A, FIG. 7B and FIG. 7C, example graphs 700A, 700B and 700C depicting example measurements with respect to a first frame and a second frame are provided (e.g., corresponding with step/operation 620, described above in connection with FIG. 6). FIG. 7A depicts a first line 701A representing an identified cumulative change in a first dimension ($\Delta x$). FIG. 7A further depicts a second line 703A representing a smoothed trajectory corresponding with the cumulative change in the first dimension ($\Delta x$).

FIG. 7B depicts a first line 701B representing an identified cumulative change in a second dimension ($\Delta y$). FIG. 7B further depicts a second line 703B representing a smoothed trajectory corresponding with the cumulative change in the second dimension ($\Delta y$).

FIG. 7C depicts a first line 701C representing an identified cumulative change in a third dimension ($\Delta z$). FIG. 7A further depicts a second line 703C representing a smoothed trajectory corresponding with the cumulative change in the third dimension ($\Delta x$).

Figures 8A, 8B, 8C:
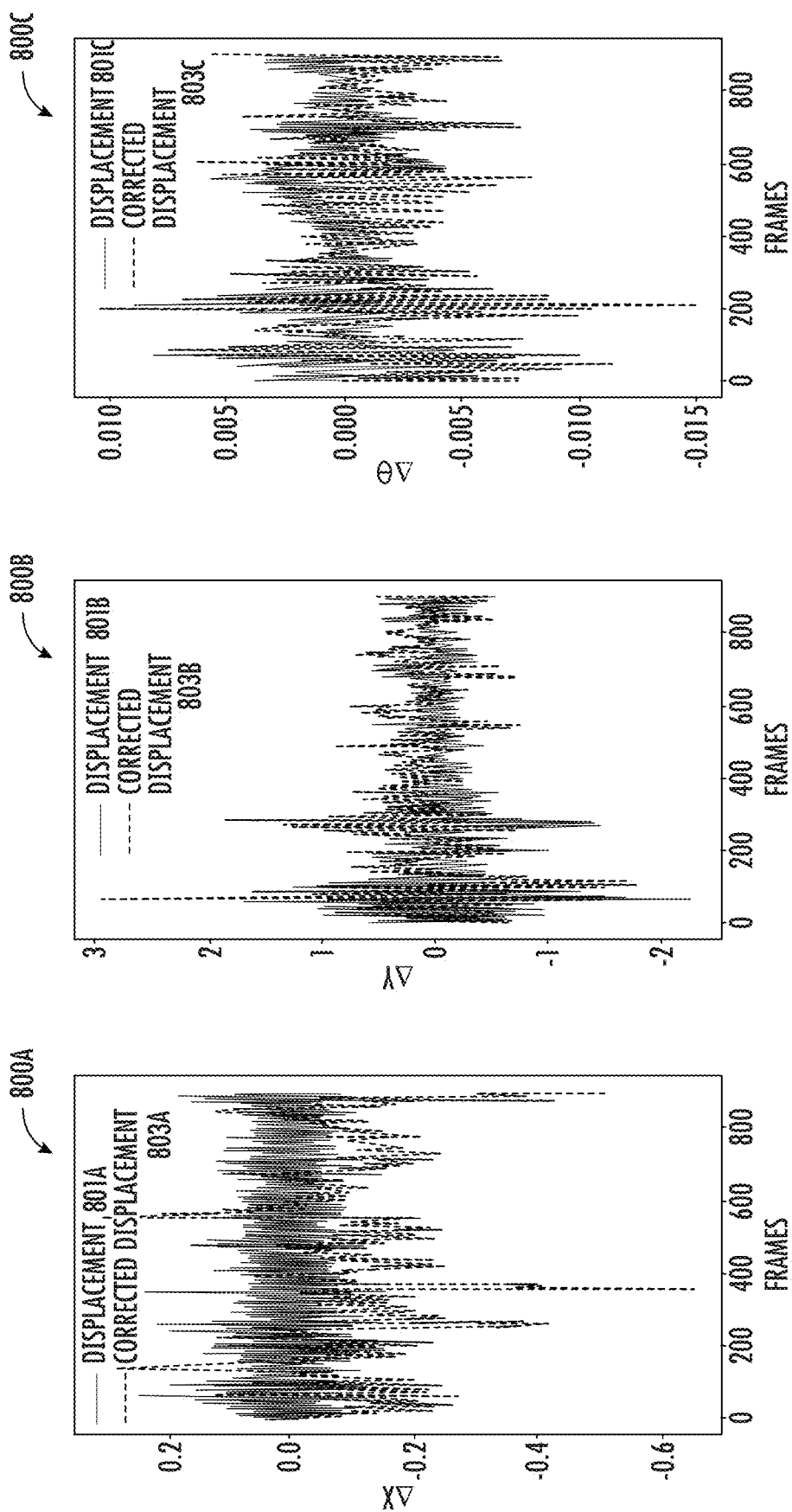
FIG. 8A illustrates an example graph in accordance with various embodiments of the present disclosure.
FIG. 8B illustrates an example graph in accordance with various embodiments of the present disclosure.
FIG. 8C illustrates an example graph in accordance with various embodiments of the present disclosure.

Referring now to FIG. 8A, FIG. 8B and FIG. 8C, example graphs 800A, 800B and 800C depicting example measurements with respect to a first frame and a second frame are provided (e.g., corresponding with step/operation 628, described above in connection with FIG. 6). FIG. 8A depicts a first line 801A representing an original amount of displacement in a first dimension ($\Delta x$). FIG. 8A further depicts a second line 803A representing a corrected amount of displacement in the first dimension ($\Delta x$).

FIG. 8B depicts a first line 801B representing an original amount of displacement in a second dimension ($\Delta y$). FIG. 8B further depicts a second line 803B representing a corrected amount of displacement in the second dimension ($\Delta y$).

FIG. 8C depicts a first line 801C representing an original amount of displacement in a third dimension ($\Delta z$). FIG. 8A further depicts a second line 803C representing corrected amount of displacement in the third dimension ($\Delta x$).

Accordingly, FIGS. 7A-7C and FIGS. 8A-8C indicate that using the above-noted processing techniques, displacement/vibration in a corrected output associated with a gas detecting apparatus is significantly reduced (e.g., on average, from a variation of around 3-4 pixels as depicted by the first lines 801A, 801B and 801C to less than 1 pixel as depicted by the second lines 803A, 803B and 803C). Thus, the accuracy of determinations generated by the example gas detecting apparatus can be significantly improved, reducing an overall count of overestimations (e.g., false positives) and underestimations (e.g., false negatives) by the gas detecting apparatus.

Many modifications and other embodiments of the present disclosure set forth herein will come to mind to one skilled in the art to which these embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A gas detecting apparatus comprising:
   at least one imaging sensor; and
   a controller component, wherein the controller component is configured to:
      obtain image data comprising at least a first frame and a second frame,
      identify a number of matching features between the first frame and the second frame, and
      in an instance in which the number of matching features satisfies a predetermined threshold number of matching features, estimate a transformation between the first frame and the second frame, and
      perform one or more vibration correction operations.

2. The gas detecting apparatus of claim 1, wherein an output of the one or more vibration correction operations is utilized to condition one or more video streams.

3. The gas detecting apparatus of claim 1, wherein the one or more vibration correction operations comprises generating a transformation matrix.

4. The gas detecting apparatus of claim 3, wherein the controller component is further configured to:
   determine vibration correction parameters/a second transformation matrix with respect to another imaging sensor of the gas detecting apparatus based at least in part on the transformation matrix.

5. The gas detecting apparatus of claim 4, wherein the at least one imaging sensor comprises a visible imaging sensor, and the another imaging sensor comprises a hyperspectral imaging sensor.

6. The gas detecting apparatus of claim 1, wherein the one or more vibration correction operations comprises at least one of a transformation operation, a smoothing operation and a border correction operation.

7. The gas detecting apparatus of claim 1, wherein the at least one imaging sensor comprises one or more of a visible imaging sensor and a hyperspectral imaging sensor.

8. The gas detecting apparatus of claim 1, wherein the controller component is further configured to:
   in an instance in which the number of matching features fails to satisfy the predetermined threshold number of matching features, generate a control indication to cause display of an alert or message.

9. The gas detecting apparatus of claim 1, wherein the number of matching features are associated with one or more points, one or more edges or one or more corners.

10. The gas detecting apparatus of claim 1, wherein the gas detecting apparatus comprises a hyperspectral gas detecting apparatus.

11. A method comprising:
    obtaining, via at least one imaging sensor of a gas detecting apparatus, image data comprising at least a first frame and a second frame,
    identifying, by a controller component, a number of matching features between the first frame and the second frame, and
    in an instance in which the number of matching features satisfies a predetermined threshold number of matching features, estimating, by the controller component, a transformation between the first frame and the second frame, and
    performing, by the controller component, one or more vibration correction operations.

12. The method of claim 11, wherein an output of the one or more vibration correction operations is utilized to condition one or more video streams.

13. The method of claim 11, wherein the one or more vibration correction operation comprises generating a transformation matrix.

14. The method of claim 13, wherein the controller component is further configured to:
    determine vibration correction parameters/a second transformation matrix with respect to another imaging sensor of the gas detecting apparatus based at least in part on the transformation matrix.

15. The method of claim 14, wherein the at least one imaging sensor comprises a visible imaging sensor, and the another imaging sensor comprises a hyperspectral imaging sensor.

16. The method of claim 11, wherein the one or more vibration correction operations comprise at least one of a transformation operation, a smoothing operation and a border correction operation.

17. The method of claim 11, wherein the at least one imaging sensor comprises one or more of a visible imaging sensor and a hyperspectral imaging sensor.

18. The method of claim 11, wherein the controller component is further configured to:
    in an instance in which the number of matching features fails to satisfy the predetermined threshold number of matching features, generate a control indication to cause display of an alert or message.

19. The method of claim 11, wherein the number of matching features are associated with one or more points, one or more edges or one or more corners.

20. The method of claim 11, wherein the gas detecting apparatus comprises a hyperspectral gas detecting apparatus.

* * * * *